(12) United States Patent
Bian et al.

(10) Patent No.: US 11,610,214 B2
(45) Date of Patent: Mar. 21, 2023

(54) DEEP REINFORCEMENT LEARNING BASED REAL-TIME SCHEDULING OF ENERGY STORAGE SYSTEM (ESS) IN COMMERCIAL CAMPUS

(71) Applicants: Desong Bian, San Jose, CA (US); Xiaohu Zhang, San Jose, CA (US); Di Shi, San Jose, CA (US); Ruisheng Diao, San Jose, CA (US); Siqi Wang, San Jose, CA (US); Zheming Liang, Tianjin (CN)

(72) Inventors: Desong Bian, San Jose, CA (US); Xiaohu Zhang, San Jose, CA (US); Di Shi, San Jose, CA (US); Ruisheng Diao, San Jose, CA (US); Siqi Wang, San Jose, CA (US); Zheming Liang, Tianjin (CN)

(73) Assignee: Global Energy Interconnection Research Institute North America, San Jose, CA (US)

( * ) Notice: Subject to any disclaimer, the term of this patent is extended or adjusted under 35 U.S.C. 154(b) by 12 days.

(21) Appl. No.: 17/102,644

(22) Filed: Nov. 24, 2020

(65) Prior Publication Data
US 2022/0036392 A1 Feb. 3, 2022

Related U.S. Application Data

(60) Provisional application No. 63/060,602, filed on Aug. 3, 2020.

(51) Int. Cl.
*G06Q 30/02* (2012.01)
*G06Q 10/06* (2012.01)
(Continued)

(52) U.S. Cl.
CPC ....... *G06Q 30/0206* (2013.01); *G06K 9/6256* (2013.01); *G06K 9/6277* (2013.01);
(Continued)

(58) Field of Classification Search
CPC .. B60L 2260/46; B60L 2260/54; B60L 58/10; B60L 58/12; G06K 9/6256;
(Continued)

(56) References Cited

U.S. PATENT DOCUMENTS 5,924,486 A * 7/1999 Ehlers ...................... F24F 11/30
165/238
2011/0231320 A1* 9/2011 Irving .................... G06Q 30/08
713/300

(Continued)

FOREIGN PATENT DOCUMENTS

CN 102999034 B * 10/2014 ........... G05B 19/418
EP 1956460 A1 * 8/2008 ......... G05D 23/1917
(Continued)

OTHER PUBLICATIONS

"Deep Reinforcement Learning for Power System Application: An Overview", by Zidong Zhang, Dongxia Zhang, and Robert C. Qiu, Fellow, IEEE, CSEE Journal of Power and Energy Systems, vol. 6, No. 1, Mar. 2020. (Year: 2020).*
(Continued)

*Primary Examiner* — Pan G Choy
(74) *Attorney, Agent, or Firm* — Patent PC; Bao Tran

(57) ABSTRACT

A system with deep reinforcement learning based control determines optimal actions for major components in a commercial building to minimize operation costs while maximizing comprehensive comfort levels of occupants. An unsupervised deep Q-network method is introduced to handle the energy management problem by evaluating the influence of operation costs on comfort levels considering
(Continued)

the environment factors at each time slot. An optimum control decision can be derived that targets both immediate and long-term goals, where exploration and exploitation are considered simultaneously.

18 Claims, 6 Drawing Sheets

(51) Int. Cl.
*G06K 9/62* (2022.01)
*G06Q 50/06* (2012.01)
*G06N 3/08* (2006.01)
*B60L 58/12* (2019.01)
*G06Q 30/0201* (2023.01)
*G06Q 10/0631* (2023.01)

(52) U.S. Cl.
CPC ......... *G06N 3/08* (2013.01); *G06Q 10/06315* (2013.01); *G06Q 50/06* (2013.01); *B60L 58/12* (2019.02)

(58) Field of Classification Search
CPC .. G06K 9/6277; G06N 3/08; G06Q 10/06315; G06Q 30/0206; G06Q 50/06
See application file for complete search history.

(56) References Cited

U.S. PATENT DOCUMENTS

| | | | | |
|---|---|---|---|---|
| 2015/0178865 A1* | 6/2015 | Anderson | ............ | G06Q 50/163 705/7.25 |
| 2015/0248118 A1* | 9/2015 | Li | ............ | G06N 3/084 706/12 |
| 2016/0048142 A1* | 2/2016 | Chan | ............ | G05B 2219/2614 700/276 |
| 2016/0187874 A1* | 6/2016 | Chen | ............ | G06Q 50/04 700/96 |
| 2020/0119556 A1* | 4/2020 | Shi | ............ | G06N 3/08 |
| 2020/0301408 A1* | 9/2020 | Elbsat | ............ | G06N 3/04 |
| 2021/0049460 A1* | 2/2021 | Ahn | ............ | G06N 3/006 |
| 2021/0158975 A1* | 5/2021 | Turney | ............ | G16Y 40/35 |

FOREIGN PATENT DOCUMENTS

| | | | | | |
|---|---|---|---|---|---|
| GB | 2528142 | A | * | 1/2016 | ............ G06Q 50/06 |
| JP | 2011106698 | A | * | 6/2011 | ............ F24F 11/02 |
| JP | 2016035360 | A | * | 3/2016 | ............ F24F 11/02 |

OTHER PUBLICATIONS

"Advanced Building Control Via Deep Reinforcement Learning", Jia et al., University of California Berkeley, Berkeley, CA 94720, 10th International Conference on Applied Energy (ICAE 2018), Aug. 22-25, 2018, Hong Kong, China. (Year: 2018).*

Jun Hao, "Deep Reinforcement Learning for the Optimization of Building Energy Control and Management", Electronic Theses and Dissertations for Graduate Studies, School of Engineering and Computer Science, University of Denver, Aug. 2020. (Year: 2020).*

Yu et al., "Deep Reinforcement Learning for Smart Home Energy Management", IEEE Internet of Things Journal, vol. 7, No. 4, pp. 2751-2762. Apr. 2020. (Year: 2020).*

Bian et al., "Deep Reinforcement Learning based Energy Management Strategy for Commercial Buildings Considering Comprehensive Comfort Levels", 2020 52nd North American Power Symposium (NAPS), IEEE 2021. (Year: 2021).*

Bian et al., "Optimal energy management for commercial buildings considering comprehensive comfort levels in a retail electricity market", GERIR North America, San Jose, CA, USA, and Department of Electrical and Computer Engineering, University of Michigan-Dearborn, MI USA . 2018 Elsevier Ltd. (Year: 2018).*

Bian et al., "Adaptive Robust Energy Management Strategy for Campus-Based Commercial Buildings Considering Comprehensive Comfort Levels", Department of Electrical and Computer Engineering, University of Michigan-Dearborn, Dearborn, MI, USA, 2019 IEEE. (Year: 2019).*

* cited by examiner

| |
|---|
| capturing operation and maintenance costs on comfort levels in the environment at each time slot or interval |
| training an unsupervised deep-Q-network to analyze the energy management |
| deriving a control decision targeting immediate and long-term goals and considering exploration and exploitation simultaneously. |

DEEP REINFORCEMENT LEARNING BASED REAL-TIME SCHEDULING OF ENERGY STORAGE SYSTEM (ESS) IN COMMERCIAL CAMPUS

This application claims priority to Provisional Application Ser. 63/060,602 filed Aug. 3, 2020, the content of which is incorporated by reference.

TECHNICAL FIELD

The present invention relates to real-time scheduling of power systems in commercial buildings.

BACKGROUND

In U.S., buildings consume approximately 40% of the total power supply, where commercial buildings (CBs) account for more than 50% among the total building power consumptions. Besides, residential households are too large in amount and too small in size compared with CBs which are not suitable to perform MW level demand response. Moreover, the peak hours of residential households (7:00 am-10:00 am and 5:00 pm-8:00 pm) are completely different from that of the CBs (11:00 am-4:00 pm), where the office hours of CBs share the same time interval as the peak hours of the distribution system. Furthermore, when curtailing or shifting the same amount of power loads, the influenced areas for the residential loads are much larger than the commercial campuses. Thus, we focus on implementing energy management strategy for CBs in this invention.

Nonetheless, comfort levels of the occupants in the CB always have higher priority comparing to the energy-consuming cost, especially during the business hours. As a result, a novel energy management strategy which provides a trade-off between the comfort level and building operation cost is needed to coordinate the operation of large appliances and other major components in CBs. Currently, the energy management strategy can be classified into three different types: (i) to minimize operating costs of the distribution system/microgrids; (ii) to maximize the comfort level of the consumers in the distribution system/microgrids or to minimize the discomfort level of the consumers in the distribution system/microgrids (mainly for comfort/discomfort level related to the indoor temperature); and (iii) to minimize the load curtailment cost/time/influence areas. Only few of prior works have jointly considered all these aspects.

Even though the well-known optimization approaches such as stochastic programming can provide the global optimal energy management decisions directly, the detailed distribution of uncertainties are hard to obtain, especially when they are highly correlated. A dynamic and self-adapting algorithm is necessary to fill such gaps. The current trend of energy management in the distribution system is based on reinforcement learning (RL). An occupant centered controller for lighting in CBs based on RL can be done but a discrete state space is not enough to represent the complex energy usage condition for a CB. Moreover, the system model changes every season, which cannot be handled by a set of determined parameters. Thus, the deep reinforcement learning (DRL) algorithm is developed to involve continuous state/action space in the real-world real-time energy management problem.

A policy gradient-based actor-critic reinforcement learning algorithm has been used to provide optimal energy management decisions for CB central controllers. Moreover, a heuristic DRL-based algorithm is developed to maintain desired indoor temperature for distributed buildings. Again, only indoor temperature related comfort level is considered in the environment.

SUMMARY

In one aspect, a deep reinforcement learning based energy management strategy minimizes operation and maintenance costs for the central controller of the CB and maximizes comprehensive comfort levels for the occupants simultaneously. A deep Q-network is utilized to provide optimal energy management decisions for the central controller of the CB.

Advantages of the above method may include one or more of the following. Extensive simulation results based on the real-world data sets show the preferred energy management framework is reliable to handle all related uncertainties considering comprehensive comfort levels.

BRIEF DESCRIPTIONS OF THE FIGURES

DETAILED DESCRIPTION OF THE ILLUSTRATED EMBODIMENTS

A DRL control strategy to provide optimal control decisions for major components in a CB to minimize operation and maintenance costs for the central controller while maximizing occupants' comprehensive comfort levels is developed. An unsupervised DRL algorithm is developed to handle the energy management problem through evaluating the influence of operation and maintenance costs on comfort levels related environments at each time slot. A deep Q-network method is utilized to provide an optimum control decision through the learning process. The trained neural network can target all aforementioned objectives, where exploration and exploitation are considered simultaneously. Extensive simulation results based on real-world data sets indicate that the preferred framework is able to minimize operating costs of a commercial building (CB) while maximizing consumers' comprehensive comfort levels.

Figures 1A, 1B:
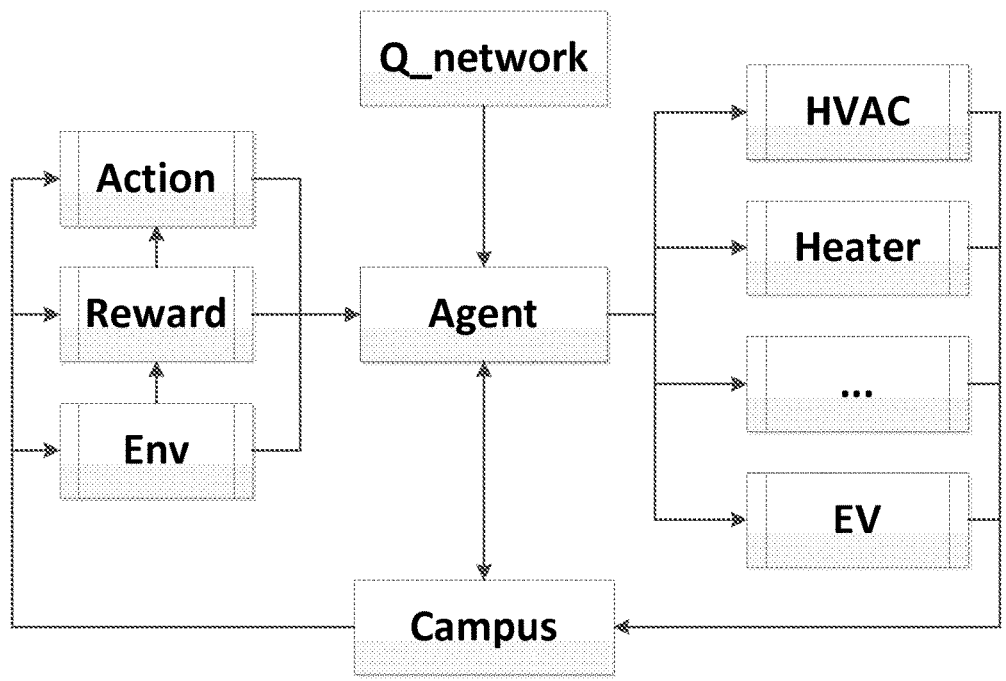
FIG. 1A shows an exemplary process to manage power in buildings.
FIG. 1B shows in detail a system to manage power in buildings.

FIG. 1A shows an exemplary DRL control method. The method includes capturing operation and maintenance costs on comfort levels in the environment at each time slot or interval; training an unsupervised deep-Q-network to analyze the energy management; and deriving a control decision targeting immediate and long-term goals while considering exploration and exploitation simultaneously.

FIG. 1B shows in detail an exemplary system to manage power in buildings. The system includes models detailing the environment, the reward, and actions to be taken. The models are provided to an agent trained using a Q network. The agent retrieves data from energy consumers in a campus building, including HVAC (air conditioning), heaters, and electric vehicles, for example. In the example commercial system, there are one CB and one parking lot, which can be scaled to multiple CBs smoothly. In the CB, there are one heating, ventilation, and air-conditioning (HVAC) system, one electric water heater (EWH), one energy storage system (ESS), one solar panel, and one aggregated base power load. There are several plug-in electric vehicles (PEVs) that owned by the occupants in the CB desire to be charged in the parking lot during the office hours. The CB also suffers from uncertain demand response request from the upstream grid operator. In order to ensure the power balance of the commercial system in the whole operating day, several reliability constraints are proposed. In one implementation, there are 96 time slots in each operating day, i.e., each time slot has 15 minutes.

A. Appliance Constraints

1) HVAC: The HVAC system is one of the most important appliances in a commercial system, especially for CBs that have critical loads that are sensitive to temperature deviations, such as servers. In order to measure the satisfaction level of the critical loads, the indoor temperature has been selected as one of the unique features to represent the comfort level related to the HVAC system. Moreover, the relationship between the dynamic of the power consumption of the HVAC system and the indoor temperature is the key point to address the trade-off between electricity cost and comfort level in the objective function. Thus, we first model the indoor temperature dynamics of the CB as follows:

$$T_{t+1}^{hvac} = \beta^{hvac} T_t^{hvac} + \alpha^{hvac} U_t, \forall t \quad (1)$$

where $T_t^{hvac} = [T_t^{in}, T_t^{iw}, T_t^{ow}]^T$, including indoor temperature, inner wall temperature, and outer wall temperature, respectively.
$U_t = [T_t^{out}, \Psi_t, \sigma_t \eta p_t^{hvac}]^T$, including outdoor temperature, solar irradiance, binary on/off action indicator of the HVAC system, and constant power consumption of the HVAC system, respectively. $\alpha$ and $\beta$ are environment coefficients of CBs.

In addition, to ensure that the critical loads cannot be damaged by the indoor temperature, we set the upper and lower bounds of the indoor temperature within the deviation from the desired indoor temperature.

$$T_d^{hvac} - \delta^{hvac} \leq T_t^{in} \leq T_d^{hvac} + \delta^{hvac}, \forall t \quad (2)$$

where $T_d^{hvac}$ is the desired indoor temperature, $\delta^{hvac}$ is the maximum temperature deviation from the desired indoor temperature.

2) EWH: Despite the requirement to maintain the indoor temperature, the hot water demand within a CB is another unique feature that needs to be tackled. In the model, the hot water demand is satisfied by an EWH, where the hot water can be stored in the water tank attached to the EWH. The water temperature within the hot water tank is selected as the representative for the comfort level related to the EWH. The detailed dynamic relationship between the water temperature and the power consumption are modeled as follows:

$$T_\tau^{ewh} = T_0^{ewh} + \Delta T^{ewh}, \Delta T^{ewh} = \sum_{t=1}^{\tau} \frac{\zeta^{ewh} z_t^{ewh} p_t^{ewh} - H_t^{de}}{C_{water} M}, \forall \tau \quad (3)$$

where $p_t^{ewh}$ is constant power consumption of the EWH. Binary variable $z_t^{ewh}$ denotes the on/off action indicator of the EWH. $\zeta^{ewh}$ is the power-to-heat ratio of the EWH. Auxiliary state variable $\Delta T^{ewh}$ is the temperature deviation of the EWH between the beginning of the operating day and the time $\tau$. Parameter $H_t^{de}$ represents the aggregated negative impacts on the temperature of the hot water in the EWH, including heat loss that is transferred to its ambient, outflow of hot water and inflow of cold water. Parameter M is the mass of water in the hot water tank, and $C_{water}$ is the specific heat capacity of water.

3) Energy Storage System (ESS): Since roof-top solar panels are considered in the preferred model, the uncertainty within the power generation process of the roof-top solar panels need to be mitigated. Additionally, reliable power supply for the critical loads such as servers must be guaranteed. Thus, the ESS is implemented in the CB to mitigate potential power imbalances. Unlike dynamic energy levels of ESS modeled in conventional studies, we use the state-of-charge (SoC) to represent the energy dynamics within the ESS as follows:

$$SoC_{k,t} = SoC_{k,t-1} + \frac{p_{k,t}^{ch} \eta_k^{ch} u_{k,t}^{ch} - \frac{p_{k,t}^{dis} u_{k,t}^{dis}}{\eta_k^{dis}}}{\bar{E}_k}, \forall k \quad (4)$$

where $p_{k,t}^{ch}$ and $p_{k,t}^{dis}$ are constant power charged into or discharged from the k-th ESS at time t, and $\eta_k^{ch}$ and $\eta_k^{dis}$ represent charging and discharging efficiencies of the k-th ESS, respectively. $u_{k,t}^{ch}$ and $u_{k,t}^{dis}$ are binary variables indicating charging and discharging decisions of the k-th ESS. Each ESS has a finite capacity, therefore, energy stored in it must have following lower and upper bounds:

$$\underline{SoC}_k \leq SoC_{k,t} \leq \overline{SoC}_k, SoC_{k,0} = SoC_{k,T}, \forall k,t \quad (s)$$

where $\overline{SoC}_k$ is upper bound and $\underline{SoC}_k$ is lower bound of the k-th ESS' SoC. Moreover, we set the initial available SoC the same as final available SoC for a better scheduling of peak hours for each operating day. Furthermore, ES units have charging and discharging limits as follows:

$$0 \leq u_{k,t}^{ch} + u_{k,t}^{dis} \leq 1, \forall k,t \quad (6)$$

where the k-th ESS cannot be charged or discharged at the same time.

4) PEV: As the trend in automobile has changed towards renewable energy sources (RES) all over the world, electric vehicles, especially PEVs, have become one of the most promising vehicles to reduce the carbon emission. It is necessary to consider the impact when a large amount of PEVs deployed in a distribution system together, which will cause a huge demand ripple that need to be mitigated through ESS and other demand response components. Thus, several PEVs are considered in the preferred model with uncertain arrival SoCs. Besides, the arrival and departure time of the PEVs are uncertain as well. Similarly, we have following charging dynamics for PEVs:

$$SoC_{v,t} = SoC_{v,t-1} + \frac{p_{v,t}^{ch} \eta_v^{ch} I_{v,t}^{ch} u_{v,t}^{ch}}{\bar{E}_v}, \forall v, t \quad (7)$$

where $p_{v,t}^{ch}$ is the constant charging rate. $\eta_v^{ch}$ is the charging efficiency. $\bar{E}_v$ is the rated energy. We use a binary variable $u_{v,t}^{ch}$ to represent charging decisions, i.e., $u_{v,t}^{ch}$ is 1, the v-th PEV is being charged; when $u_{v,t}^{ch}$ is 0, the v-th PEV is in an idle status.

In addition, to prolong the lifetime of the batteries with in the PEV, the upper and lower bounds of PEVs' SoC are modeled as follows:

$$\underline{SoC}_v \leq SoC_{v,t} \leq \overline{SoC}_v, \forall v,t \quad (8)$$

where upper bound $\overline{SoC}_v$ and lower bound $\underline{SoC}_v$ are imposed to enhance batteries' lifetimes.

B. Comprehensive Comfort Levels

In order to quantify the satisfaction levels related to comprehensive components, the idea of comfort level is proposed. In this section, three major comfort levels are modeled: i) comfort level relate to indoor temperature; ii) comfort level related to water temperature; and iii) comfort level related to SoC, respectively.

1) Comfort Level Related to Indoor Temperature: As aforementioned, the indoor temperature directly related to the comfort levels of both the critical loads and the occupants inside the CB, which is necessary to be ensured within a pre-defined range. Therefore, we propose the following model to capture the unique feature of the indoor temperature in a CB with a HVAC system:

$$J_{hvac,t} = \begin{cases} 0, & T_t^{in} \geq T^{max} \\ 1 - \dfrac{T_t^{in} - \left(T_d^{hvac} + \delta^{hvac}\right)}{\delta^{hvac}}, & T_d^{hvac} + \delta^{hvac} \leq T_t^{in} \leq T^{max} \\ 1, & T_d^{hvac} - \delta^{hvac} \leq T_t^{in} \leq T_d + \delta^{hvac} \\ \dfrac{T_t^{in} - \left(T_d^{hvac} - \delta^{hvac}\right)}{\delta^{hvac}}, & T^{min} \leq T_t^{in} \leq T_d^{hvac} - \delta^{hvac} \\ 0, & T_t^{in} \leq T^{min} \end{cases} \quad (9)$$

Comfort indoor temperature zone is defined as $T_d^{hvac} \pm \delta^{hvac}$, where $\delta^{hvac}$ is maximum indoor temperature deviation from desired temperature that can still ensure a comfort temperature zone. The most comfort level relate to the indoor temperature is 1 and the most uncomfort level related to the indoor temperature is 0.

2) Comfort Level Related to Water Temperature

The water temperature in the water tank attached to the EWH is closely related to the occupants' comfort level, which is relatively important to maintain above a certain threshold.

$$T_d^{ewh} - \delta^{ewh} \leq T_\tau^{ewh}, \forall \tau \quad (10)$$

Parameter $T_d^{ewh}$ is the desired water temperature in the hot water tank of the EWH.

$$J_{ewh,\tau} = \begin{cases} 1, & T_d^{ewh} \leq T_\tau^{ewh} \\ \dfrac{T_\tau^{ewh} - \left(T_d^{ewh} - \delta^{ewh}\right)}{T_d^{ewh} - \left(T_d^{ewh} - \delta^{ewh}\right)}, & T_d^{ewh} - \delta^{ewh} \leq T_\tau^{ewh} \leq T_d^{ewh} \\ 0, & T_\tau^{ewh} \leq T_d^{ewh} - \delta^{ewh} \end{cases} \quad (11)$$

Parameter $\delta^{ewh}$ is the maximum allowed temperature deviation from desired water temperature. Similarly, 1 represents the most comfort level and 0 denotes the most uncomfort level related to water temperature.

3) Comfort Level Related to SoC

Even though SoC can be treated as comfort level relate to the energy in the batteries directly, the unique features of PEVs cannot be handle by SoC itself. Thus, the comfort level relate to SoC preferably captures the relationship between a desired SoC and an actual SoC of each PEV.

$$J_{v,t} = \begin{cases} 1, & SoC_v^d \leq SoC_{v,t} \\ \dfrac{SoC_{v,t} - SoC_v^{base}}{SoC_v^d - SoC_v^{base}}, & SoC_v^{base} \leq SoC_{v,t} \leq SoC_v^d \in \\ 0, & SoC_{v,t} \leq SoC_v^{base} \end{cases} \quad (12)$$

$J_{v,t}$ denotes comfort level of the v-th PEV owner. $SoC_v^d$ is desired SoC for the v-th PEV. $SoC_v^{base}$ represents base SoC required for the v-th PEV with round trip between the owner's house and the CB.

C. Reliability Constraints

The reliability of the CB's power supply is supported by both the distributed generation units within the commercial system and the upstream grid. However, both energy sources may be unreliable due to the uncertainties associated with the power generation process and the demand response signal. Therefore, it is important to ensure the reliability of the power supply of the CB through the preferred constraints.

1) Power Balance

The power supply must be the same as the power consumption, where the power supply includes: discharging of ESS, power generation of roof-top solar panel and the power delivery from the main grid; and the power consumption includes: charging of ESS, charging of PEVs, power used by HVAC system, power consumed by EWH, and the power for the base load. We denote aggregate critical power loads as $d_t$ that must be satisfied. Therefore, we have following power balance equation:

$$\sum_k \left(p_{k,t}^{dis} u_{k,t}^{dis} - p_{k,t}^{ch} u_{k,t}^{ch}\right) + w_t + p_{g,t} u_{g,t} = \quad (13)$$

$$d_t + p_t^{ewh} z_t^{ewh} + p_t^{hvac} \sigma_t + \sum_v p_{v,t}^{ch} I_{v,t} u_{v,t}^{ch}, \forall t$$

Parameter $w_t$ denotes the output of renewables. Parameter $p_{g,t}$ represent real-time power buy from a retail electricity market based on the uncertain real-time electricity prices. Binary variable $u_{g,t}$ is preferred to select which power amount to buy from the main grid.

2) Uncertain Grid-Connection Condition

Additionally, we use $\overline{P}_g$ to represent the capacity limit on the point of common coupling (PCC) g. Moreover, in order to protect substations and transformers, the distribution system operator may perform the load curtailment in the peak hours, where the power exchange through the PCC between the CB and the main grid will be zero. Thus, a parameter $I_{g,t} \in [0, 1]$ is adopted to model the uncertain load curtailment signals from a system operator during the peak hours. Then, we have the following constraints on the grid-connected tie-line:

$$0 \leq p_{g,t} u_{g,t} \leq \overline{P}_g I_{g,t}, \forall g, t \in [40, 68] \quad (14)$$

$$0 \leq p_{g,t} u_{g,t} \leq \overline{P}_g, \forall g, t \notin [40, 68]$$

$$\sum_g u_{g,t} \leq 1, \forall t.$$

Binary variable $u_{g,t}$ denotes the selection of PCC to perform the power exchange, which means the system can be extend to multiple commercial systems with different PCCs.

Our objective in this invention is to develop an optimal energy management strategy for the central controller of a CB that can automatically minimize the operation and maintenance costs and maximize comprehensive comfort levels for occupants during the office hours (8:00 am-8:00 pm). Even though the CB considered is not a black box, there are still a lot of uncertainties associate with the energy management process such as base load demand, power output of renewables, electricity prices, and PEV arrival SoC and arrival/departure time.

In order to mitigate the influence of lacking comprehensive information on the distribution of aforementioned uncertainties, we model the energy management process as a Markov decision process (MDP) with the environment models formulated in Section I at each time step t. In addition, we formulate the MDP model based on a tuple with four vectors: S, A, R, S', where S and A denotes the state and action spaces, respectively. S' is the state space after the transition through the environment from the original state space S, i.e., from time t to time t+1. R: S×A×S'=>R represents the reward function, i.e., the immediate reward obtained by the central controller of the CB after taking the action A that changes from state S to state S'.

In the preferred model, the states are considered to be continuous for the whole time interval, while the actions are set to be discrete, which adhere to the nature of the major components in a CB. The detailed information for the state space, action space and reward function are introduced as follows:

States: The states of the DRL based energy management strategy is represented by a vector including $[T_t^{in}, T_t^{iw}, T_t^{ow}, SoC_{v,t}, SoC_{k,t}, T_\tau^{ewh}]$, which denotes the indoor temperature, the inner wall temperature, the outer wall temperature, the SoC of PEV v, the SoC of ESS k, and the water temperature of the EWH, respectively. The upper and lower bounds of the each state variable are as follows: $T_t^{in} \in [18, 28]$; $SoC_{v,t} \in [6.25\%, 93.75\%]$. $SoC_{k,t} \in [20\%, 100\%]$ and $T_\tau^{ewh} \in [20, 100]$.

The actions are taken at each time step based on the maximization purpose of the cumulated Q values. The actions of the DRL based energy management strategy is represented by a vector including $[\sigma_t, u_{v,t}^{ch}, (u_{k,t}^{ch} u_{k,t}^{dis}), z_t^{ewh}, u_{g,t}]$. The terms in the vector indicate the on/off status of HVAC system, the charging/idle status of the PEVs, the charging/discharging status of the ESS, the load serving condition of the EWHs, and the binary variable that select which power amount to buy from the main grid, respectively. All actions are binary variables.

Reward: The objective is to minimize operating costs of the preferred CB while maximizing occupants' comfort levels. In order to apply the preferred DRL approach, the objective needs to be formulate into a reward function. The preferred reward function includes the electricity purchase cost, the degradation cost of ESS as penalty terms; and comfort levels related with indoor temperature, SoC of PEV and water temperature as reward terms. We formulate the preferred energy management problem over a operating day, where the comfort levels are considered during the business hours. In addition, we can combine these terms together through unification to formulate the detailed reward function as follows:

$$R_t = \quad (15)$$

$$-C_g p_{g,t} u_{g,t} - \sum_k C_{ESS}(p_{k,t}^{ch} u_{k,t}^{ch} + p_{k,t}^{dis} u_{k,t}^{dis}) + J_{hvac,t} + \sum_v I_{v,t} J_{v,t} + J_{ewh,t}.$$

Note that $C_g$ denotes the uncertain retail electricity prices. Parameter $C_{ESS}$ is the degradation cost coefficient of the ESS.

All simulations are implemented on a desktop computer with 3.0 GHz Intel Core i5-7400 CPU and 8 GB RAM. The preferred DRL based energy management problem is simulated using Python 3.5, Gurobi 8.0 and Tensorflow 1.8.

D. Convergence of the Training Process

Figure 2:
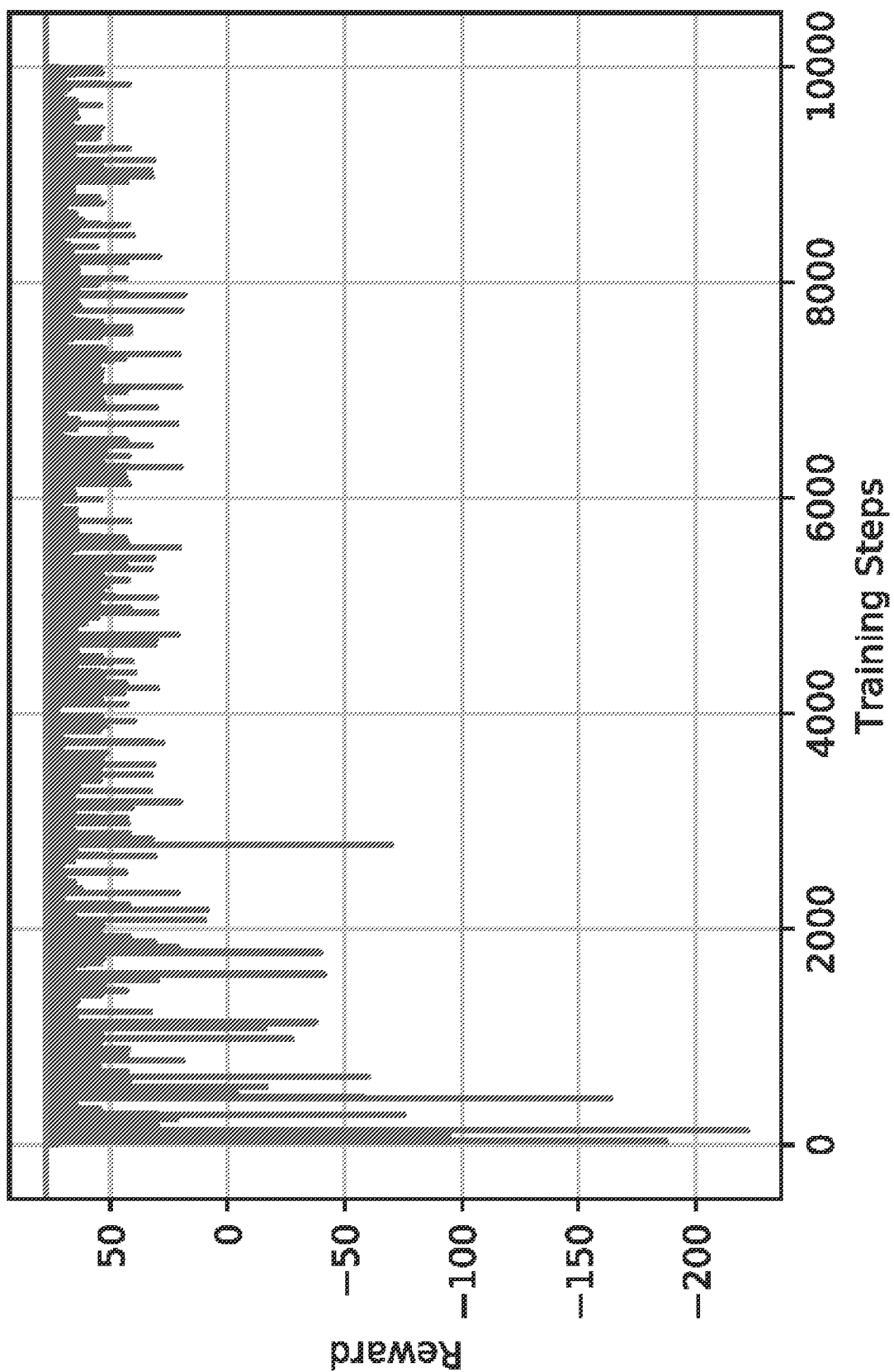
FIG. 2 shows an exemplary smoothed reward for the training process of 10,000 highly intermittent episodes.
Figure 3:
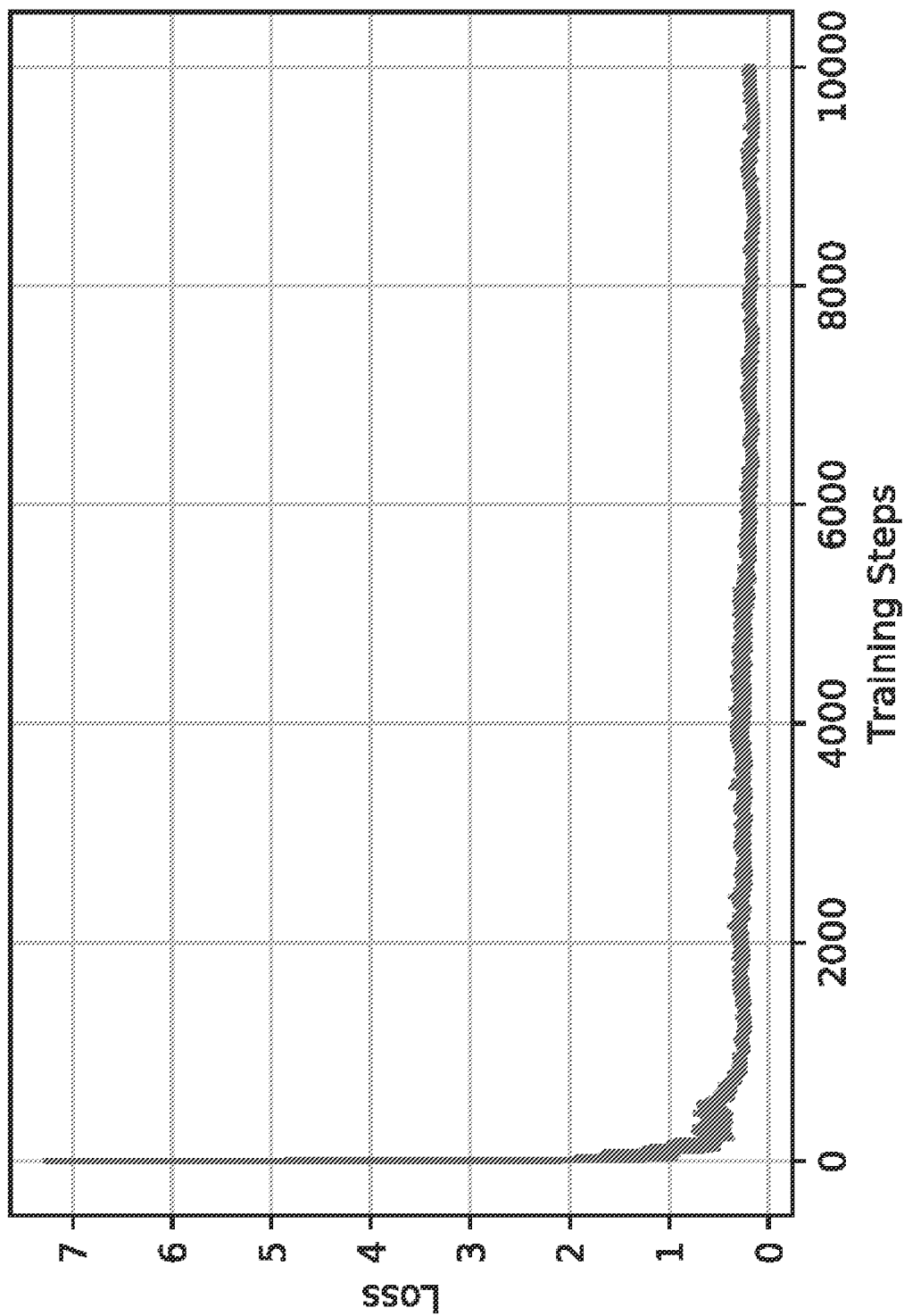
FIG. 3 shows an exemplary smoothed loss for the training process of 10,000 highly intermittent episodes.

We first train the preferred deep Q-network (DQN) with 10,000 highly intermittent episodes for each operating day, which contains 48 time slots in business hours from 8:00 am-8:00 pm. The episodes are generated based on four uncertainties, namely: base load demand, power output of renewables, electricity prices, and PEV arrival SoC and arrival/departure time (the uncertainties related to PEVs are highly correlated). As shown in FIG. 2, the smoothed reward expends as the number of training episodes increases. Note that the "smoothed reward" represents the aggregation process of the rewards for all the time slots in one operating day. Even though the rewards tend to vary during the training process due to aforementioned uncertainties, the preferred DQN learns the optimal action pairs quickly. Moreover, as shown in FIG. 3, the smoothed losses for the whole business hours decrease as the number of training episodes expends. This demonstrates that the random selected samples are closer to the batch episodes. The convergence rate of the preferred DQN is about 2,000 episodes, where the increment of the reward and the decrement of the loss for the training process are slower than previous stages.

E. DRL Versus Scenario-Based Stochastic Optimization Approach

To benchmark the performance of the preferred DRL approach, we adopt a scenario-based stochastic optimization approach-based energy management strategy for the same 10,000 scenarios that generated from the four uncertainties. The possibilities of the scenarios are assumed to be the same as 1/10000. The objective function for the scenario-based stochastic optimization approach is the same as the reward function for the preferred DRL approach. The models and constraints for the scenario-based stochastic optimization approach are similar to the preferred DRL approach as well. Through python and gurobi, we obtain the global optimal expected value of the objective function as 77.62 for the entire business hours. The trend of rewards is approaching the expected value of the optimization approach (the red horizontal line). Thus, the simulation result validates the convergence of the preferred DRL approach after the training process to the global optimum.

F. Testing Process and Sensitivity Analysis

Figure 4:
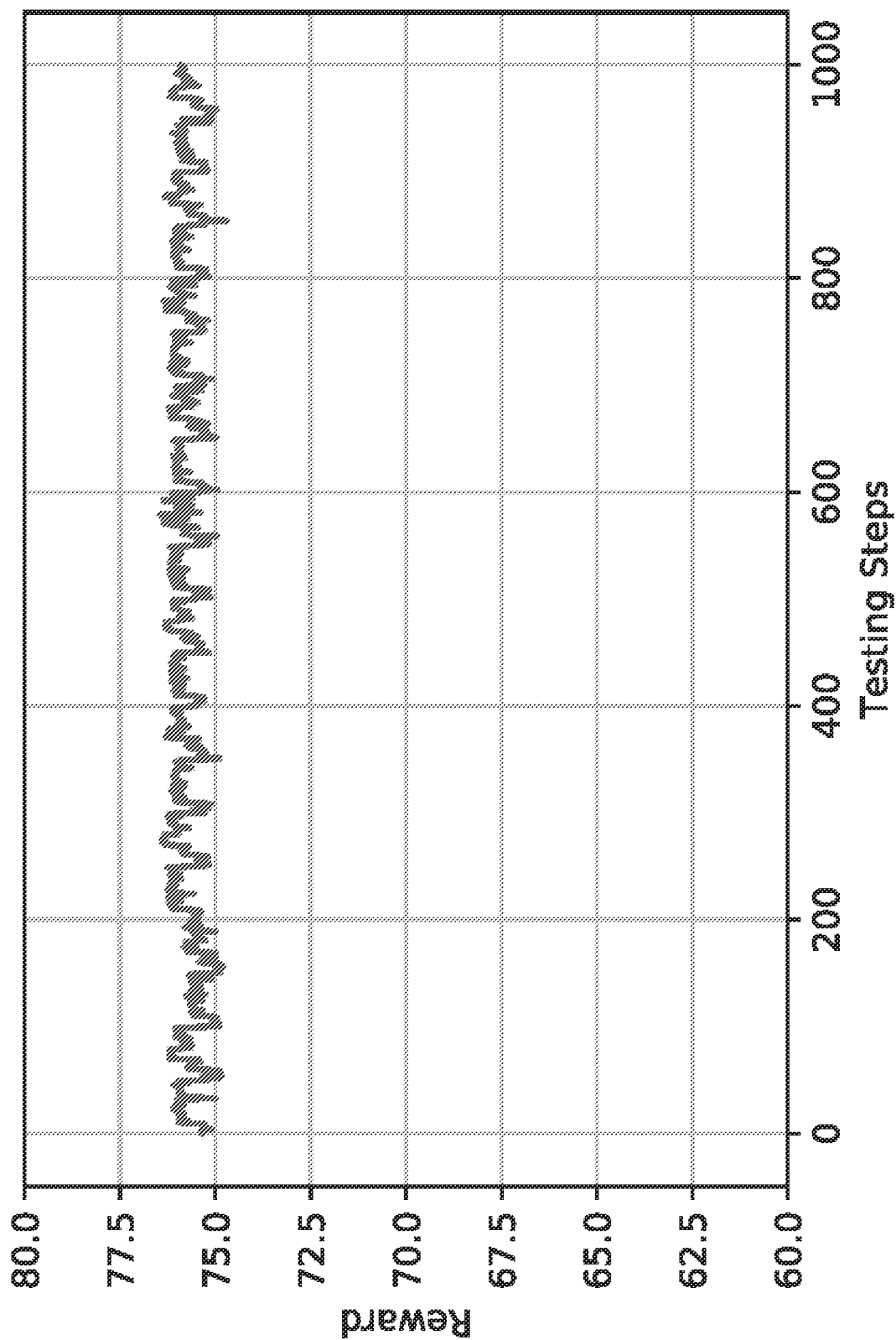
FIG. 4 shows an exemplary smoothed reward for the testing process of one set of 1,000 new episodes.
Figure 5:
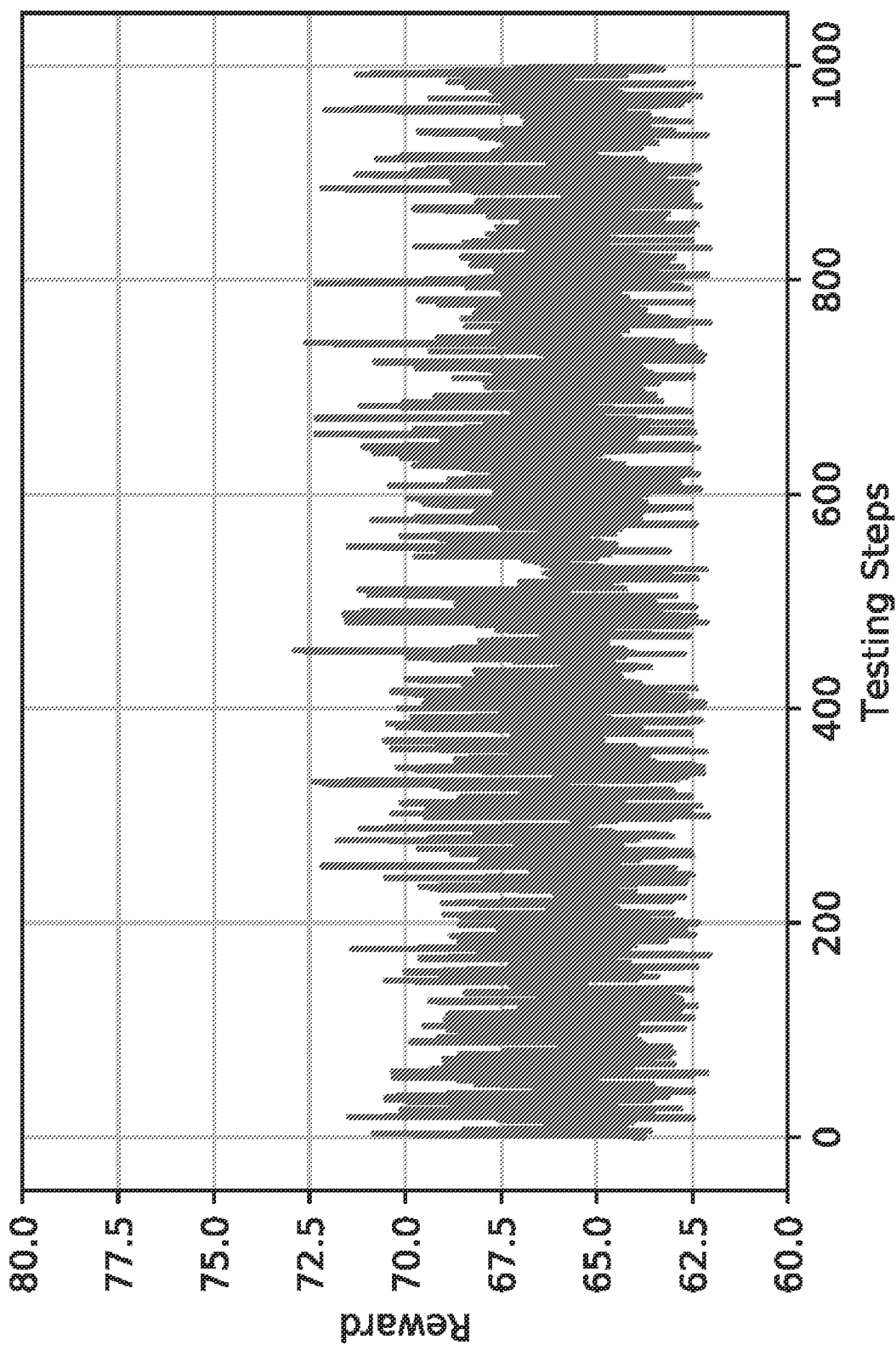
FIG. 5 shows an exemplary smoothed reward for the testing process of the other set of 1,000 new episodes.

In addition, we test the trained DQN with two sets of 1,000 new episodes based on different uncertainty distributions of the four aforementioned uncertainties. The first set of 1,000 new episodes share the same electricity prices and the same PEVs' arrival SoCs and arrival/departure time patterns with the 10,000 training episodes. The based load demand and power output of renewables for the first set are from alternative distributions. The second set of 1,000 new episodes share the same electricity price patterns with the 10,000 training episodes. The rest three uncertainties are based on different distributions (also different from the first set). In this way, we could exam the capability of the preferred DRL approach in handling unknown states and environments. As shown in FIG. 4 and FIG. 5, the smoothed rewards for the whole business hours accumulated the highest reward for each episode in all two sets. The simulation results can be illustrated in three folds. First, the preferred DQN is perfectly trained based on the 10,000 episodes, where the testing rewards are close to the optimum. Second, the uncertainties associate with the energy management process are highly correlated, which can be traced from one to another. Third, for a certain period, the rewards share a similar shape as shown in FIG. 4-5. This is reasonable since the scenarios are generated based on monthly data which is the same as the period of 30 episodes.

In summary, the simulation results ensure the reliability and effectiveness of the DRL based energy management strategy where a deep reinforcement learning based control strategy to determine optimal actions for major components in a commercial building to minimize operation and maintenance costs while maximizing comprehensive comfort levels of occupants. The unsupervised deep Q-network method handles the energy management problem by evaluating the influence of operation and maintenance costs on comfort levels related environments at each time slot. An optimum control decision is derived that targets both immediate and long-term goals, where exploration and exploitation are considered simultaneously. Extensive simulation results validate the effectiveness of the preferred deep reinforcement learning based energy management strategy.

Figure 6:
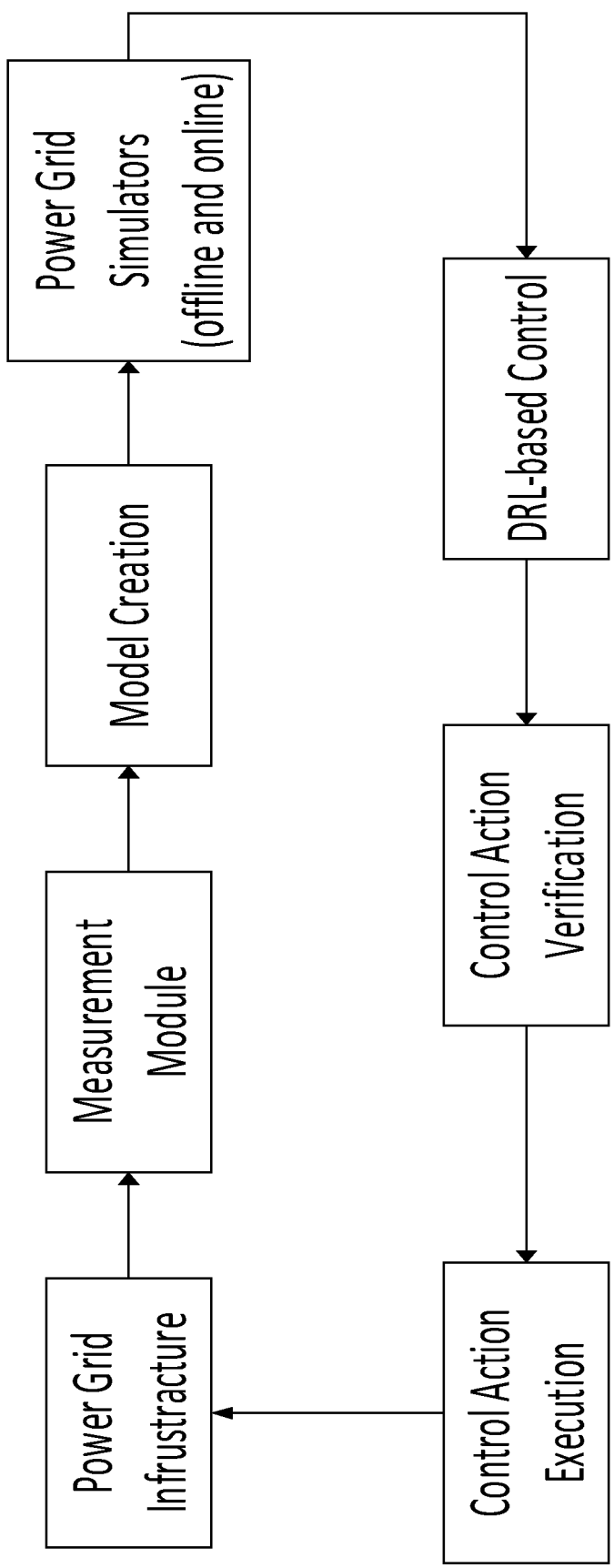
FIG. 6 shows an exemplary power grid control system using the above framework.

An example of test bed can be found in FIG. 6. The test bed models the exemplary Power Grid and Sensor Network where data collected from energy management system (EMS) or phasor measurement unit (PMU) is transmitted through communication networks to the data server. The data server stores and manages the measured data and provides data pipeline to the application server. The pre-trained reinforcement learning model is running on the application server. The control command and expected performance is sent to the user interface and shown to the users. The test bed running the method of FIG. 2 has a framework is modeled by the following:

capturing CB operation and maintenance costs on comfort levels in the environment at each time slot or interval;

training an unsupervised deep-Q-network to analyze the energy management; and deriving a control decision targeting immediate and long-term goals and considering exploration and exploitation simultaneously.

The system supports training effective SAC agents with periodic updating for multi-objective power flow control in real-time operational environment. The detailed design and flowchart of the proposed methodology are provided for reducing transmission losses without violating voltage and line constraints. Numerical simulations conducted on a real power network in real-time operational environment demonstrates the effectiveness and robustness.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As used herein, the term "module" or "component" may refer to software objects or routines that execute on the computing system. The different components, modules, engines, and services described herein may be implemented as objects or processes that execute on the computing system (e.g., as separate threads). While the system and methods described herein may be preferably implemented in software, implementations in hardware or a combination of software and hardware are also possible and contemplated. In this description, a "computing entity" may be any computing system as previously defined herein, or any module or combination of modulates running on a computing system. All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method to manage energy for a commercial building (CB) including an energy management system (EMS) with a processor, comprising:

capturing CB operation and maintenance costs on comfort levels in an environment at each time slot or interval;

training an unsupervised deep-Q-network to analyze the energy management within an upper and lower bounds by modeling comfort level temperature dynamics of the CS as:

$$T_{t+1}^{hvac} = \beta^{hvac} T_t^{hvac} + \alpha^{hvac} U_t, \forall t$$

where $T_t^{hvac} = [T_t^{in}, T_t^{iw}, T_t^{ow}]^T$, including indoor temperature, inner wall temperature, and outer wall temperature, respectively, $U_t = [T_t^{out}, \Psi_t, \sigma_t \eta p_t^{hvac}]^T$, including outdoor temperature, solar irradiance, binary on/off action indicator of the HVAC system, and constant power consumption of the HVAC system, respectively, $\alpha$ and $\beta$ are environment coefficients of CBs; and continuously modeling comfort level for indoor temperature, comfort level related to water temperature, and comfort level for a state-of-charge (SoC);

deriving, via the unsupervised deep-Q-network, an optimal control decision targeting immediate and long-term goals and considering exploration and exploitation simultaneously;

controlling, by the processor, the energy management system for a desired comfort level and energy usage of the CB based on the optimal control decision; and updating the unsupervised deep-Q-network with multi-objective power flow control in real-time operational environment.

2. The method of claim 1, comprising setting upper and lower bounds of an indoor temperature within a deviation from a desired indoor temperature:

$$T_d^{hvac} - \delta^{hvac} \leq T_t^{in} \leq T_d^{hvac} + \delta^{hvac}, \forall t$$

where $T_d^{hvac}$ is the desired indoor temperature, $\delta^{hvac}$ is the maximum temperature deviation from the desired indoor temperature.

3. The method of claim 1, comprising modeling a dynamic relationship between water temperature and power consumption are modeled as:

$$T_\tau^{ewh} = T_0^{ewh} + \Delta T^{ewh}, \Delta T^{ewh} = \sum_{t=1}^{\tau} \frac{\zeta^{ewh} z_t^{ewh} p_t^{ewh} - H_t^{de}}{C_{water} M}$$

where $p_t^{ewh}$ is constant power consumption of the EWH, Binary variable $z_t^{ewh}$ denotes the on/off action indicator of the EWH, $\zeta^{ewh}$ is the power-to-heat ratio of the EWH, auxiliary state variable $\Delta T^{ewh}$ is the temperature deviation of the EWH between a beginning of the operating day and time $\tau$, parameter $H_t^{de}$ represents aggregated negative impacts on the temperature of the hot water in the EWH, including heat loss that is transferred to its ambient, outflow of hot water and inflow of cold water, parameter M is the mass of water in the hot water tank, and $C_{water}$ is the specific heat capacity of water.

4. The method of claim 1, comprising using the state-of-charge (SoC) to represent energy dynamics of an energy storage system (ESS) as:

$$SoC_{k,t} = SoC_{k,t-1} + \frac{p_{k,t}^{ch}\eta_k^{ch}u_{k,t}^{ch} - \frac{p_{k,t}^{dis}u_{k,t}^{dis}}{\eta_k^{dis}}}{\overline{E}_k}, \forall k, t$$

where $p_{k,t}^{ch}$ and $p_{k,t}^{dis}$ are constant power charged into or discharged from the k-th ESS at time t, and $\eta_k^{ch}$ and $\eta_k^{dis}$ represent charging and discharging efficiencies of the k-th ESS, respectively, $u_{k,t}^{ch}$ and $u_{k,t}^{dis}$ are binary variables indicating charging and discharging decisions of the k-th ESS.

5. The method of claim 1, comprising charging dynamics for electric vehicles (PEVs) as:

$$SoC_{v,t} = SoC_{v,t-1} + \frac{p_{v,t}^{ch}\eta_v^{ch}I_{v,t}u_{v,t}^{ch}}{\overline{E}_v}, \forall v, t$$

where $p_{v,t}^{ch}$ is a constant charging rate, $\eta_v^{ch}$ is a charging efficiency, $\overline{E}_v$ is a rated energy, a binary variable $u_{v,t}^{ch}$ represents charging decisions.

6. The method of claim 1, comprising modeling a comfort level for Indoor Temperature as $$J_{hvac,t} = \begin{cases} 0, & T_t^{in} \geq T^{max} \\ 1 - \frac{T_t^{in} - (T_d^{hvac} + \delta^{hvac})}{\delta^{hvac}}, & T_d^{hvac} + \delta^{hvac} \leq T_t^{in} \leq T^{max} \\ 1, & T_d^{hvac} - \delta^{hvac} \leq T_t^{in} \leq T_d + \delta^{hvac} \\ \frac{T_t^{in} - (T_d^{hvac} - \delta^{hvac})}{\delta^{hvac}}, & T^{min} \leq T_t^{in} \leq T_d^{hvac} - \delta^{hvac} \\ 0, & T_t^{in} \leq T^{min} \end{cases}$$

where the comfort indoor temperature zone is defined as $T_d^{hvac} \pm \delta^{hvac}$, where $\delta^{hvac}$ is maximum indoor temperature deviation from desired temperature.

7. The method of claim 1, comprising modeling a Comfort Level Related to Water Temperature as $$T_d^{ewh} - \delta^{ewh} \leq T_\tau^{ewh}, \forall \tau$$

parameter $T_d^{ewh}$ is a desired water temperature in a hot water tank, $$J_{ewh,\tau} = \begin{cases} 1, & T_d^{ewh} \leq T_\tau^{ewh} \\ \frac{T_\tau^{ewh} - (T_d^{ewh} - \delta^{ewh})}{T_d^{ewh} - (T_d^{ewh} - \delta^{ewh})}, & T_d^{ewh} - \delta^{ewh} \leq T_\tau^{ewh} \leq T_d^{ewh} \\ 0, & T_\tau^{ewh} \leq T_d^{ewh} - \delta^{ewh} \end{cases}$$

parameter $\delta^{ewh}$ is a maximum allowed temperature deviation from desired water temperature, 1 represents the most comfort level and 0 denotes the most uncomfort level for water temperature.

8. The method of claim 1, comprising the relationship between a desired SoC and an actual SoC of each electric vehicle PEV.

9. The method of claim 8, comprising determining:

$$J_{v,t} = \begin{cases} 1, & SoC_v^d \leq SoC_{v,t} \\ \frac{SoC_{v,t} - SoC_v^{base}}{SoC_v^d - SoC_v^{base}}, & SoC_v^{base} \leq SoC_{v,t} \leq SoC_v^d \in \\ 0, & SoC_{v,t} \leq SoC_v^{base} \end{cases}$$

$J_{v,t}$ denotes comfort level of the v-th PEV owner, $SoC_v^d$ is desired SoC for the v-th PEV, $SoC_v^{base}$ represents base SoC required for the v-th PEV with round trip between a PEV owner house and the CB.

10. The method of claim 1, comprising conforming with a power balance:

$$\sum_k \left( p_{k,t}^{dis}u_{k,t}^{dis} - p_{k,t}^{ch}u_{k,t}^{ch} \right) + w_t + p_{g,t}u_{g,t} =$$
$$d_t + p_t^{ewh}z_t^{ewh} + p_t^{hvac}\sigma_t + \sum_v p_{v,t}^{ch}I_{v,t}u_{v,t}^{ch}, \forall t$$

where parameter $w_t$ denotes the output of renewables, parameter $p_{g,t}$ represents real-time power buy from a retail electricity market based on uncertain real-time electricity prices, and binary variable $u_{g,t}$ selects which power amount to buy from a grid.

11. The method of claim 1, comprising performing energy management as a Markov decision process (MDP) model with environment models at each time step.

12. The method of claim 11, wherein the MDP model comprises a tuple with four vectors: S, A, R, S', where S and A denotes state and action spaces, respectively, S' is a state space after a transition through the environment from the original state space S, R:S×A×S'=>R represents a reward function obtained by taking the action A that changes from state S to state S'.

13. The method of claim 1, comprising representing energy management strategy states by a vector including indoor temperature, inner wall temperature, outer wall temperature, state of charge (SoC) of electric vehicle and energy storage system, and water temperature, respectively.

14. The method of claim 1, comprising minimizing operating costs while maximizing occupant comfort levels.

15. The method of claim 1, comprising optimizing for a reward function including electricity purchase cost, ESS degradation cost and comfort levels related with indoor temperature, electric vehicle state of charge and water temperature as reward terms.

16. The method of claim 1, comprising receiving data for 48 time slots per day.

17. The method of claim 1, comprising receiving intermittent episodes for each operating day.

18. The method of claim 1, comprising receiving data for base load demand, power output of renewable energy, electricity price, and PEV arrival SoC and arrival/departure time.

\* \* \* \* \*